United States Patent [19]
May

[11] Patent Number: 5,889,730
[45] Date of Patent: Mar. 30, 1999

[54] UNDERWATER AUDIO COMMUNICATION SYSTEM USING BONE CONDUCTED SOUND

[75] Inventor: David F. May, Columbus, Ind.

[73] Assignee: Trigger Scuba, Inc., Columbus, Ind.

[21] Appl. No.: 2,824

[22] Filed: Jan. 5, 1998

[51] Int. Cl.⁶ .................................................. H04B 11/00
[52] U.S. Cl. ............................................................ 367/132
[58] Field of Search .................................... 367/132, 131; 381/151, 68.3, 326; 128/201.19; 379/175; 340/850

[56] References Cited

U.S. PATENT DOCUMENTS

| | | | |
|---|---|---|---|
| 4,039,999 | 8/1977 | Weston | 367/132 |
| 5,047,994 | 9/1991 | Lenhardt et al. | 367/116 |
| 5,579,284 | 11/1996 | May | 367/132 |
| 5,586,176 | 12/1996 | Peck | 367/132 |
| 5,706,251 | 1/1998 | May | 367/132 |

*Primary Examiner*—Daniel T. Pihulic
*Attorney, Agent, or Firm*—Taylor & Associates, P.C.

[57] ABSTRACT

An underwater audio communication system to be worn by a diver is connected with and carried by a conventional face mask such that bone conduction occurs through the mastoid bone of the diver (i.e., behind the ear of the diver). The underwater audio communication system includes a face mask with a head strap for placement behind the head of the diver. A transceiver which is connected with and carried by the head strap is configured for receiving and transmitting ultrasonic signals in the water. At least one bone conduction transducer assembly is connected with and carried by the head strap at a location for placement against a mastoid bone of the diver. Each bone conduction transducer assembly is electrically connected with the transceiver.

31 Claims, 4 Drawing Sheets

UNDERWATER AUDIO COMMUNICATION SYSTEM USING BONE CONDUCTED SOUND

BACKGROUND OF THE INVENTION

1. Field of the Invention

The present invention relates to audio communication systems, and, more specifically, to underwater audio communication systems.

2. Description of the Related Art

Underwater audio communication systems using bone conducted sound are known. For example, it is known to provide a scuba diving mouthpiece having a sound transducer therein which is placed in direct contact with a surface of a tooth of the diver. A problem with this type of arrangement is that it is difficult to maintain continuous contact pressure between the sound transducer and the surface of the tooth. If contact is lost between the sound transducer and tooth, audio communication with the diver is entirely lost. Other problems with this type of a mouthpiece are that the metallic sound transducer may come in contact with a metallic filling in the tooth of the diver, thereby causing galvanic electric currents to flow in the tooth of the diver with accompanying unpleasant sensations. Another problem is that the sound transducer which is in direct contact with the tooth may in fact chip or break the tooth if a biting force is applied to the mouthpiece by the diver or some other external force is applied to the mouthpiece.

An underwater audio communication apparatus providing improved audio communication with greater comfort to the diver and greater clarity and amplitude of sound is disclosed in U.S. Pat. No. 5,579,284 (May) and soon to issue U.S. Pat. No. 5,706,251 (May). Each of these patents broadly incorporate the principal of embedding a sound transducer entirely within a mouthpiece to avoid safety concerns and unpleasant sensations experienced by the diver which are associated with other known mouthpieces for bone conduction of audio sound. The sound transducer and/or sound propagating element associated therewith are provided with an increased surface area which assists in propagation of the sound through the mouthpiece.

What is needed in the art is an underwater audio communication system which is compact, economical and provides other alternative options to a diver for carrying out effective underwater audio communication using bone conducted sound.

SUMMARY OF THE INVENTION

The present invention provides an underwater audio communication system including a transceiver and at least one bone conduction transducer assembly which may be connected with and carried by a conventional face mask such that bone conduction occurs through the mastoid bone of the diver (i.e., behind the ear of the diver).

The invention comprises, in one form thereof, an underwater audio communication system for use by a diver in water. A face mask has a head strap for placement behind the head of the diver. A transceiver which is connected with and carried by the head strap is configured for receiving and transmitting ultrasonic signals in the water. At least one bone conduction transducer assembly is connected with and carried by the head strap at a location for placement against a mastoid bone of the diver. Each bone conduction transducer assembly is electrically connected with the transceiver.

An advantage of the present invention is that the underwater audio communication system may be used with conventional face masks worn by a diver.

Another advantage is that underwater audio communication is effected without the diver wearing a face mask which covers the mouth.

Yet another advantage is that the bone conduction transducer assembly is placed in association with the mastoid bone and thereby provides good audio communication through bone conducted sound.

An additional advantage is that the bone conduction transducer assembly is held against the mastoid bone of the diver to ensure good audio communication.

A still further advantage is that the underwater audio communication system of the present invention may be easily and effectively used with little or no training.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates one preferred embodiment of the invention, in one form, and such exemplification is not to be construed as limiting the scope of the invention in any manner.

DETAILED DESCRIPTION OF THE INVENTION

Figure 1:
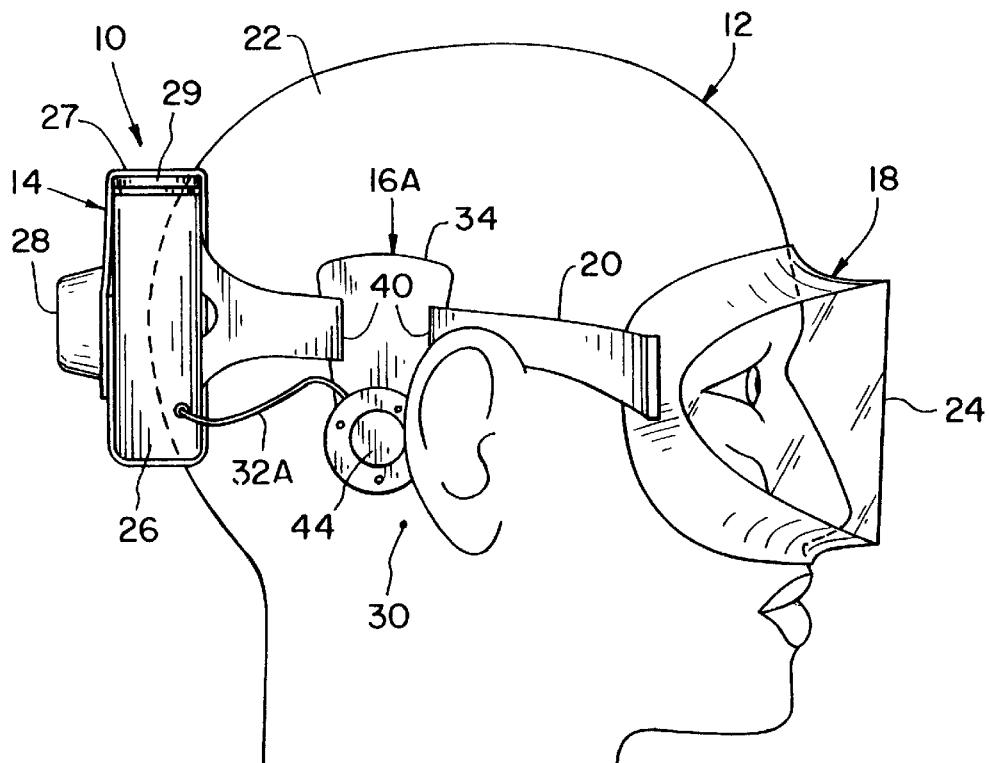
FIG. 1 is a right side view of a diver wearing an embodiment of an underwater audio communication system of the present invention.
Figure 2:
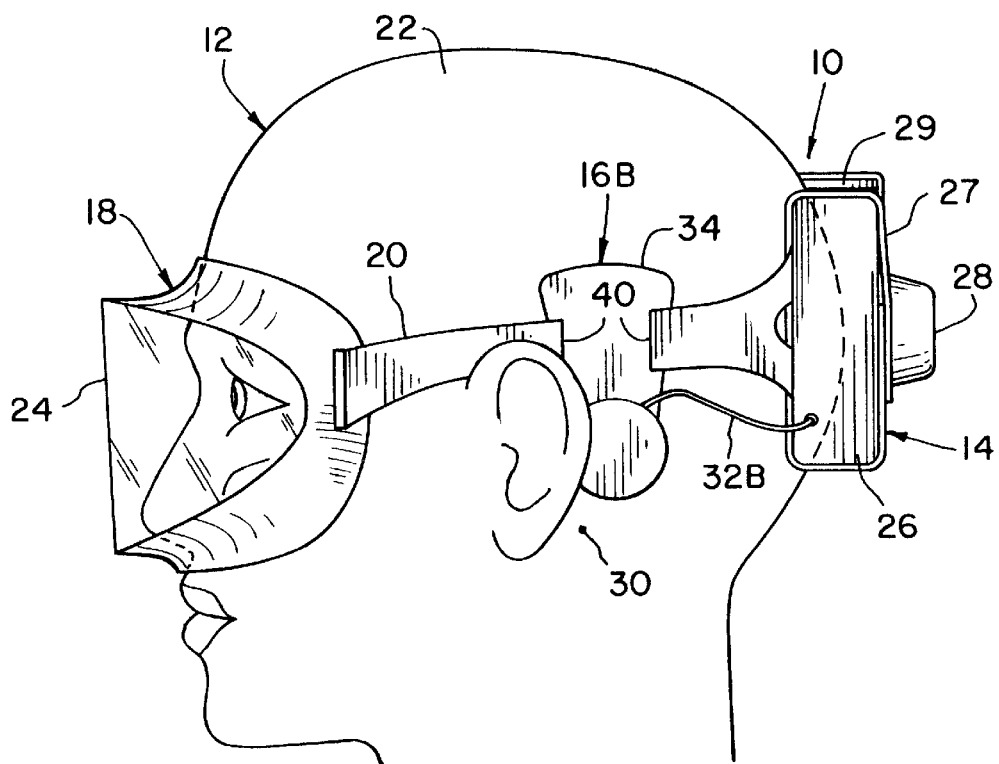
FIG. 2 is a left side view of the diver and underwater audio communication system shown in FIG. 1.
Figure 3:
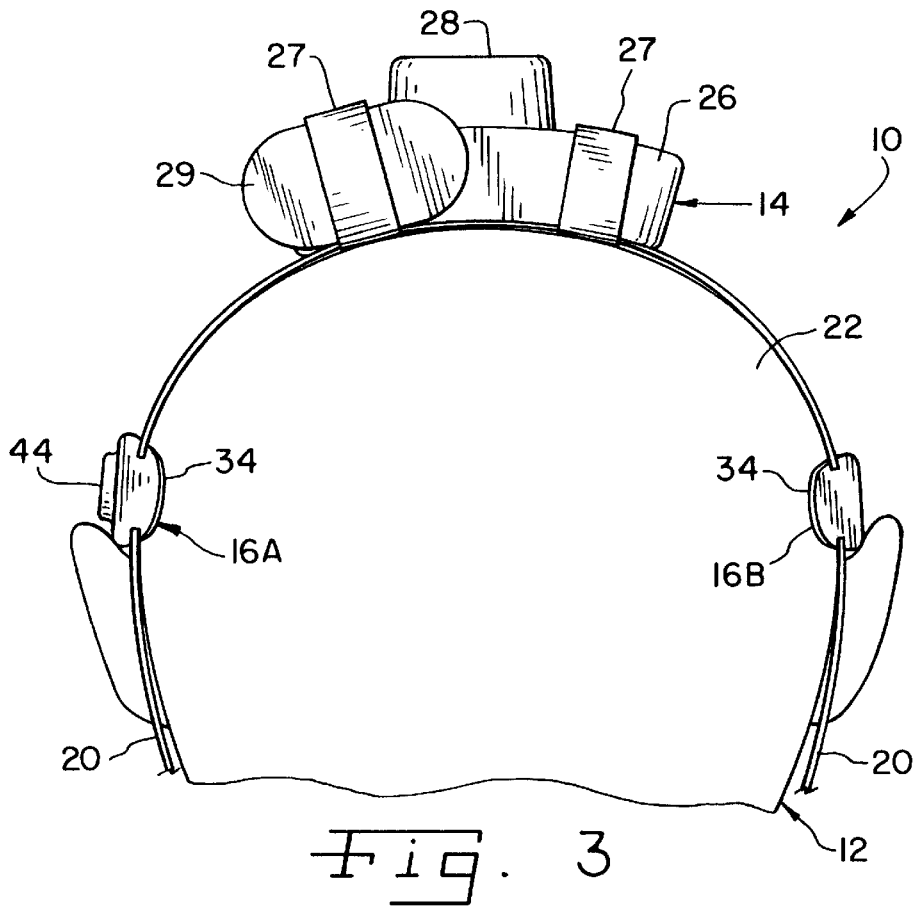
FIG. 3 is a fragmentary, top view of the diver and underwater audio communication system shown in FIGS. 1 and 2.
Figure 4:
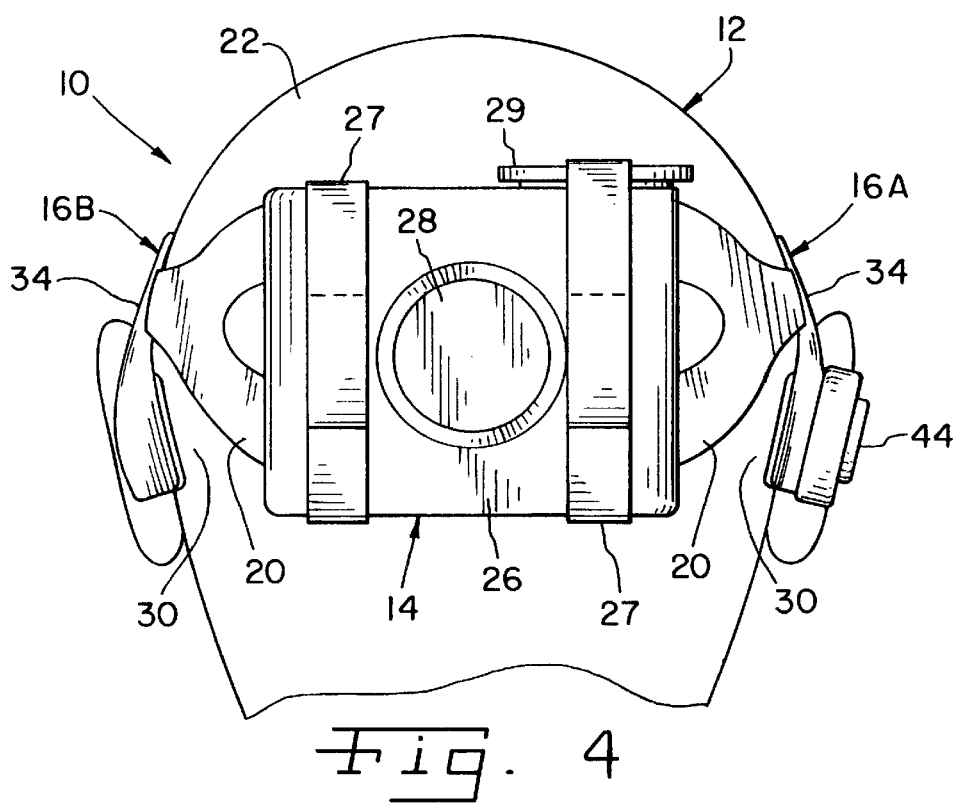
FIG. 4 is a rear view of the diver and underwater audio communication system shown in FIGS. 1–3.

Referring now to the drawings, and more particularly to FIGS. 1–4, there is shown an embodiment of an underwater audio communication system 10 for use by a diver 12 in water. Underwater audio communication system 10 includes a transceiver 14 and two bone conduction transducer assemblies 16 which are connected with and carried by a face mask 18.

Face mask 18 is of conventional design in the embodiment shown, and includes a head strap 20 for placement behind the head 22 of diver 12. Face mask 18, in known manner, includes a viewing window 24 allowing diver 12 to see underwater. In the embodiment shown, face mask 18 seals against the upper lip of diver 12 between the nose and mouth, thereby allowing diver 12 to use a conventional snorkel or diving mouthpiece and breathing regulator. Head strap 20 may be of conventional design, and holds face mask 18 against the face of diver 12. Head strap 20 may be longitudinally split at the rear of head 22 of diver 12 as shown, to allow face mask 18 to be held in place against the face of diver 12 with more stability.

Transceiver 14 includes a hermetically sealed housing 26 having projections, slots or other suitable structure allowing attachment with head strap 20. In the embodiment shown, two straps 27 with mating hook and loop fasteners at each end thereof wrap around each of housing 26 and head strap 20, and thereby connect transceiver 14 with head strap 20. Transceiver 14 is configured for receiving and transmitting ultrasonic signals in the water, thereby allowing diver 12 to communicate with other divers and/or with a communication system at the surface of the water. More particularly, housing 26 of transceiver 14 includes a projection 28 which houses an ultrasonic transducer for receiving and transmitting ultrasonic signals in the water. The electrical circuitry used to effect the transmission and reception of ultrasonic signals may be of known design, and is not described in greater detail herein. For example, reference is hereby made to U.S. Pat. No. 5,579,284 (May) and soon to issue U.S. Pat. No. 5,706,251 (May) which both describe an ultrasonic transceiver which may be used for receiving and transmitting ultrasonic signals in water. A battery cover 29 provides access to a D.C. battery (not shown) within transceiver 14, which in turn provides electrical power to system 10.

The two bone conduction transducer assemblies 16, individually referenced 16A and 16B in FIGS. 1–4, are each connected with and carried by head strap 20 at a location for placement against mastoid bone 30 located behind each ear of diver 12. Bone conduction transducer assemblies 16A and 16B are electrically connected with transceiver 14 via respective electrical conductors 32A and 32B. Conductors 32A and 32B may merely extend between transceiver 14 and bone conduction transducer assemblies 16A and 16B as shown if head strap 20 is of conventional design, or may be embedded within head strap 20 if desired.

Figure 5:
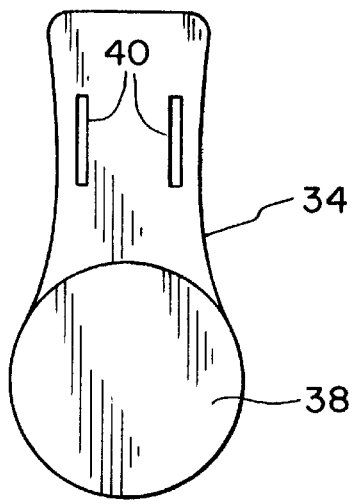
FIG. 5 is a plan view of the bone conduction transducer assembly shown on the right side of FIG. 4, viewing the side placed against the head of the diver.
Figure 6:
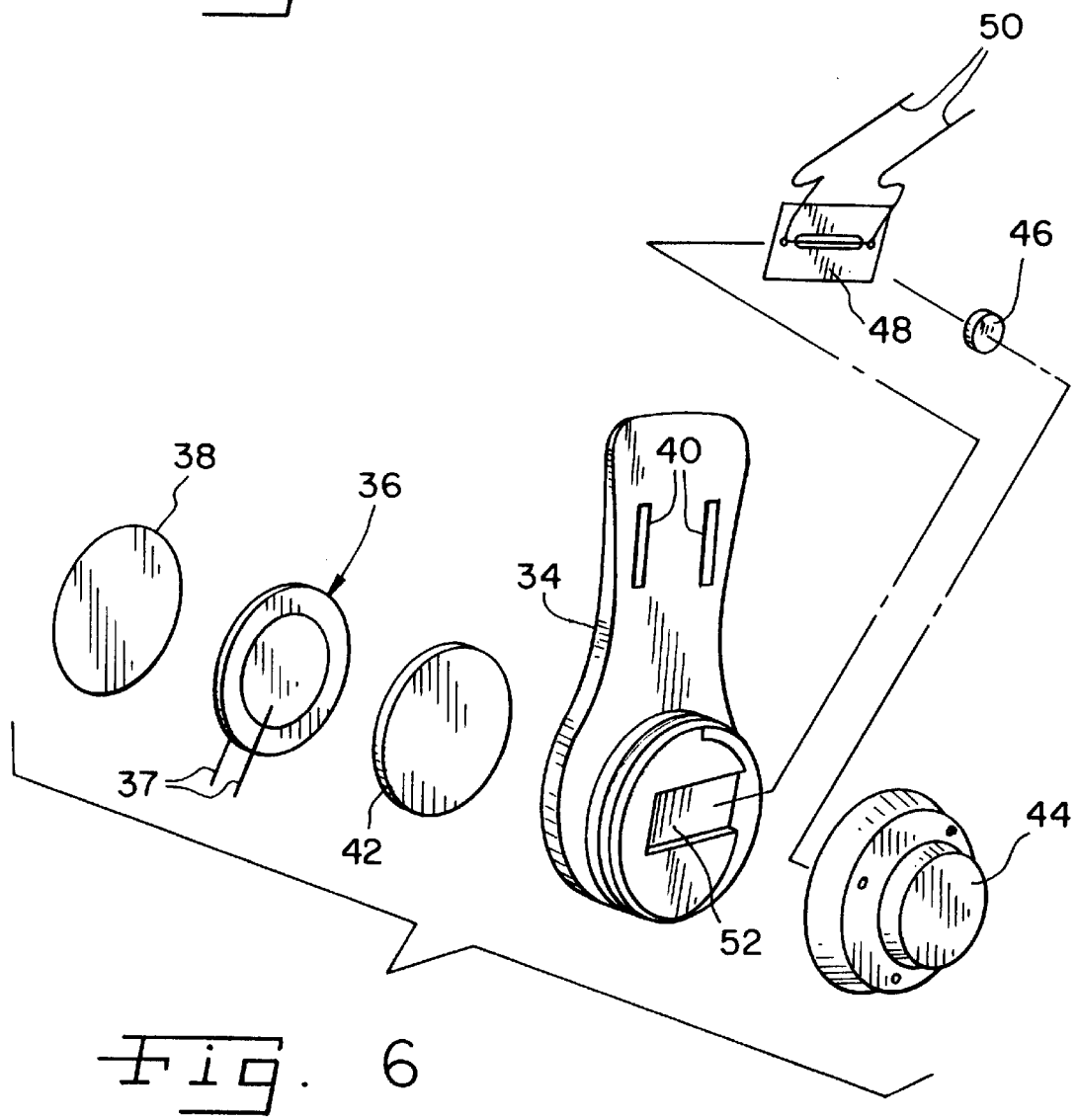
FIG. 6 is an exploded, perspective view of the bone conduction transducer assembly shown in FIG. 5.
Figure 7:
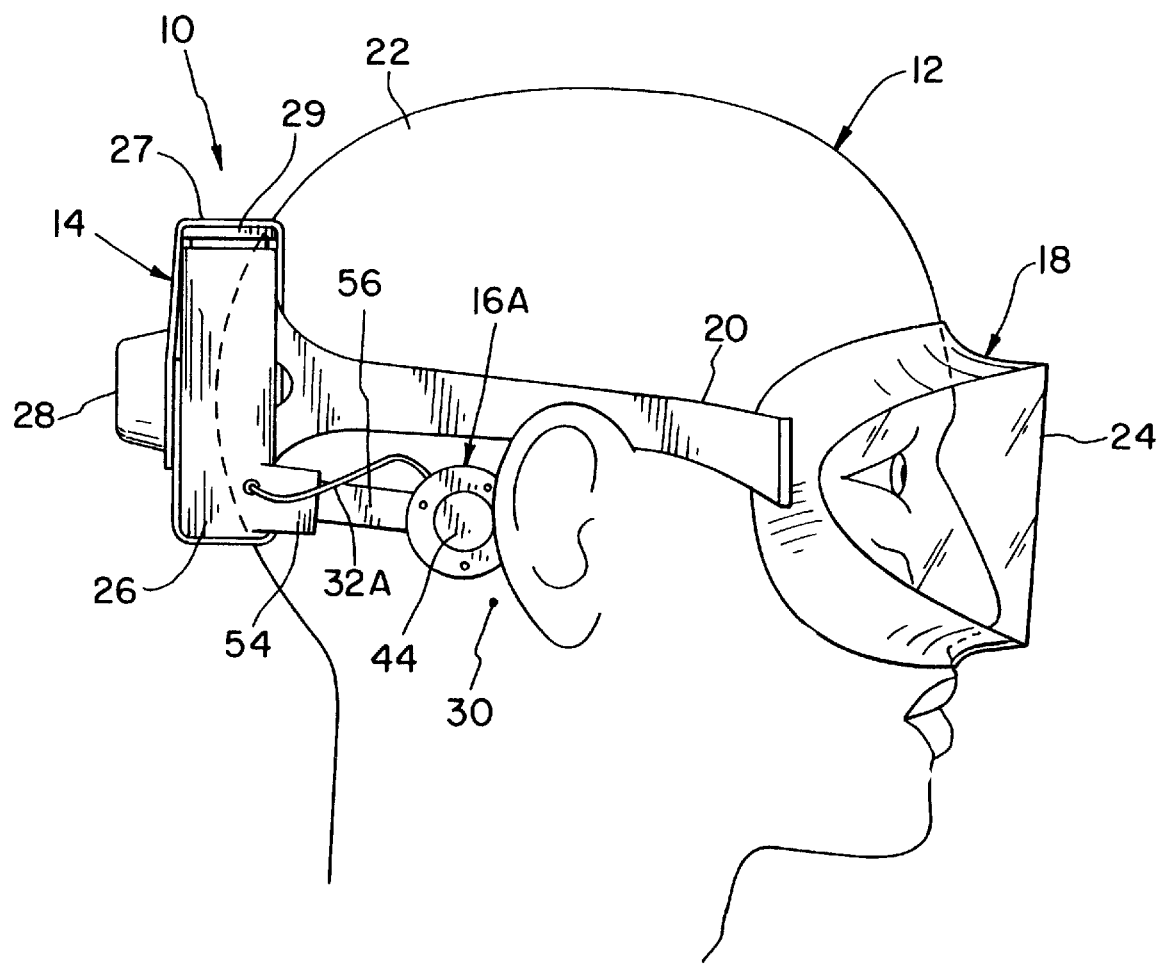
FIG. 7 is a right side view of a diver wearing another embodiment of an underwater audio communication system of the present invention.

Each bone conduction transducer assembly 16A and 16B is configured for receiving sound from and transmitting sound to respective mastoid bones 30 of diver 12. More particularly, referring to FIGS. 5 and 6, bone conduction transducer assembly 16A includes a body 34, a sound transducer in the form of a piezo electric element 36 and an acoustic conductor 38. Body 34 includes two through slots 40 through which head strap 20 extends to thereby connect bone conduction transducer assembly 16A with head strap 20.

Piezo electric element 36 defines a sound transducer which receives sound from mastoid bone 30 when diver 12 talks, and transmits sound to mastoid bone 30 dependent upon ultrasonic signals received by transceiver 14. Piezo electric element 36 is connected with transceiver 14 via electrical conductors 37. Piezo electric element 36 is disposed within body 34 and at least partially isolated from body 34 using an intervening closed cell plastic foam disk 42.

Acoustic conductor 38 transmits sound from piezo electric element 36 to mastoid bone 30 of diver 12, and vice versa. Acoustic conductor 38 is formed from a compliant material such as polyurethane providing both comfort to the user as well as effective transmission of sound therethrough between piezo electric element 36 and mastoid bone 30. Acoustic conductor 38 can of course be formed from other materials which at least provide good transmission of sound, and preferably also provide comfort to diver 12. Acoustic conductor 38 is positioned at an exterior of body 34 and is pressed against head 22 of diver 12 adjacent to mastoid bone 30. More particularly, body 34 is connected with head strap 20 and has a shape which biases acoustic conductor 38 against mastoid bone 30 of diver 12. For example, body 34 may have a curved shape which, when connected with head strap 20, causes acoustic conductor 38 to be biased against mastoid bone 30. Effective sound transmission between piezo electric element 36 and mastoid bone 30 is thereby ensured.

Bone conduction transducer assembly 16A also includes a push-to-push talk (PTT) switch 44. PTT switch 44 is a silicone rubber button which may be depressed by diver 12, which in turn biases a magnet 46 toward a reed switch 48. Reed switch 48 is connected with and closes an electrical connection between terminal ends 50, which in turn are connected with electronic circuitry within transceiver 14. Upon depressing PTT switch 44 and closing of reed switch 48, a signal is provided to transceiver 14 which places transceiver 14 in a transmit mode and allows piezo electric element 36 to be used as a microphone for receiving voice signals from diver 12, which in turn cause corresponding ultrasonic signals to be transmitted from transceiver 14 through the water to another diver or surface location. Reed switch 48 is disposed within a correspondingly shaped recess 52 formed in body 34. PTT switch 44 is sealingly connected with body 34 such that magnet 46 and reed switch 48 are hermetically sealed therein.

Bone conduction transducer assembly 16B, which is placed on the left side of head 22 of diver 12 in the embodiment shown, is similar to bone conduction transducer assembly 16A in that it also includes a body 34, piezo electric element 36, acoustic conductor 38, through slots 40 and plastic disk 42. However, bone conduction transducer assembly 16B does not includes a PTT switch 44, magnet 46 or reed switch 48 enabling a PTT mode of transceiver 14. Rather, only one bone conduction transducer assembly, i.e., bone conduction transducer assembly 16A, is provided with PTT switch 44 for enabling a transmit mode or state of transceiver 14.

In the embodiment of underwater audio communication system 10 shown in the drawings and described above, transceiver 14 and bone conduction transducer assemblies 16A and 16B are constructed as separate pieces which are electrically interconnected with each other via appropriate electrical conductors. Each of transceiver 14 and bone conduction transducer assemblies 16A and 16B are separately attached to and carried by head strap 20 of face mask 18. However, it is also to be understood that transceiver 14 and bone conduction transducer assemblies 16A and 16B may be formed as a unitary system with structural arms 54 which interconnect transceiver 14 with bone conduction transducer assemblies 16A and 16B. The structural arms may be fixed in length or adjustable in length, such as by telescoping arms 56. The structural arms may be somewhat rigid, or preferably may be somewhat resilient to accommodate for different sizes and shapes of heads of a diver 12. The resilient arms may be spread apart to accommodate a diver 12 having a larger head, while at the same time providing a biasing force to bias bone conduction transducer assembly 16A and 16B toward the mastoid bone of diver 12. When configured as a unitary structure, it is possible to still connect transceiver 14 as well as bone conduction transducer assemblies 16A and 16B to head strap 20. However, it is also possible to only connect transceiver 14 to head strap 20. If only transceiver 14 is connected with head strap 20, bone conduction transducer assemblies 16A and 16B are nonetheless indirectly connected with and carried by head strap 20 through the interconnection between transceiver 14 and head strap 20.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An underwater audio communication system for use by a diver in water, comprising:

a face mask having a head strap for placement above the ear and behind the head of the diver;

a transceiver connected with and carried by said head strap, said transceiver being configured for receiving and transmitting ultrasonic signals in the water; and at least one bone conduction transducer assembly connected with and carried by said head strap at a location for placement against a mastoid bone of the diver, each said bone conduction transducer assembly being electrically connected with said transceiver, each said bone conduction transducer assembly being configured for receiving sound from and transmitting sound to the mastoid bone of the diver.

2. The underwater audio communication system of claim 1, wherein said at least one bone conduction transducer assembly includes:

an acoustic conductor; and a body, said body having:

a lower portion carrying said acoustic conductor, said lower portion having a curved inner surface configured for conforming to the diver's head behind the diver's ear and biasing said acoustic conductor against the mastoid bone of the diver; and an upper portion having at least one slot receiving said head strap, said upper portion having a substantially flat inner surface configured for conforming to the diver's head behind and above the diver's ear.

3. The underwater audio communication system of claim 1, wherein at least one said bone conduction transducer assembly includes a body, a piezo electric element within said body, and an acoustic conductor for transmitting sound from the piezo electric element to the mastoid bone of the diver.

4. The underwater audio communication system of claim 3, wherein said acoustic conductor is positioned at an exterior of said body.

5. The underwater audio communication system of claim 4, wherein said acoustic conductor is constructed from a compliant material.

6. The underwater audio communication system of claim 5, wherein said acoustic conductor is constructed from polyurethane.

7. The underwater audio communication system of claim 3, wherein said body is connected with said head strap such that said acoustic conductor is pressed against the head of the diver adjacent the mastoid bone.

8. The underwater audio communication system of claim 1, wherein at least one said bone conduction transducer assembly includes a body, a piezo electric element within said body, an acoustic conductor for transmitting sound from the piezo electric element to the mastoid bone of the diver, and a push-to-talk switch.

9. The underwater audio communication system of claim 8, wherein said push-to-talk switch includes a magnet and a reed switch.

10. The underwater audio communication system of claim 1, wherein each said bone conduction transducer assembly includes at least one through slot through which said head strap extends.

11. The underwater audio communication system of claim 10, wherein each said bone conduction transducer assembly includes two through slots.

12. The underwater audio communication system of claim 1, wherein said transceiver includes an ultrasonic transducer for transmission and reception of ultrasonic signals in the water.

13. An underwater audio communication system for use in water with a face mask having a head strap for placement behind the head of a diver, comprising:

a transceiver configured to be connected with and carried by the head strap, said transceiver being further configured for receiving and transmitting ultrasonic signals in the water; and at least one bone conduction transducer assembly configured to be connected with and carried by said head strap at a location for placement against a mastoid bone of the diver, each said bone conduction transducer assembly being electrically connected with said transceiver, each said bone conduction transducer assembly being configured for receiving sound from and transmitting sound to the mastoid bone of the diver.

14. The underwater audio communication system of claim 13, wherein at least one said bone conduction transducer assembly includes a body, a sound transducer within said body, and an acoustic conductor for transmitting sound from said sound transducer to the mastoid bone of the diver.

15. The underwater audio communication system of claim 14, wherein said acoustic conductor is positioned at an exterior of said body.

16. The underwater audio communication system of claim 15, wherein said acoustic conductor is constructed from a compliant material.

17. The underwater audio communication system of claim 16, wherein said acoustic conductor is constructed from polyurethane.

18. The underwater audio communication system of claim 14, wherein said sound transducer comprises a piezo electric element.

19. The underwater audio communication system of claim 13, wherein at least one said bone conduction transducer assembly includes a body, a piezo electric element within said body, an acoustic conductor for transmitting sound from the piezo electric element to the mastoid bone of the diver, and a push-to-talk switch.

20. The underwater audio communication system of claim 19, wherein said push-to-talk switch includes a magnet and a reed switch.

21. The underwater audio communication system of claim 13, wherein said underwater audio communication system is non-unitary with said transceiver and each said bone conduction transducer assembly being separate from each other.

22. A bone conduction transducer assembly for use with an underwater audio communication system by a diver wearing a face mask with a head strap, said bone conduction transducer assembly comprising:

a body configured to be connected with and carried by the head strap of the face mask at a location for placement against a mastoid bone of the diver;

a sound transducer disposed within said body; and an acoustic conductor positioned at an exterior of said body, said acoustic conductor comprised of a compliant material and configured for both transmitting sound from said sound transducer to the mastoid bone of the diver and transmitting sound from the mastoid bone of the diver to said sound transducer.

23. The bone conduction transducer assembly of claim 22, wherein said acoustic conductor is constructed from polyurethane.

24. The bone conduction transducer assembly of claim 22, further comprising a push-to-talk switch.

25. The bone conduction transducer assembly of claim 24, wherein said push-to-talk switch includes a magnet and a reed switch.

26. The bone conduction transducer assembly of claim 22, wherein each said bone conduction transducer assembly includes at least one through slot configured for receiving the head strap therein.

27. The bone conduction transducer assembly of claim 26, wherein each said bone conduction transducer assembly includes two through slots.

28. The bone conduction transducer assembly of claim 22, wherein said sound transducer comprises a piezo electric element.

29. An underwater audio communication system for use by a diver in water, comprising:

a face mask having a head strap for placement above the ear and behind the head of the diver; and a unitary transceiver/transducer assembly including:

a transceiver connected with and carried by said head strap, said transceiver configured for receiving and transmitting ultrasonic signals in the water;

at least one structural arm extending from said transceiver; and at least one bone conduction transducer assembly configured for being biased against a mastoid bone of the diver by said at least one structural arm, each said bone conduction transducer assembly being configured for receiving sound from and transmitting sound to the mastoid bone of the diver, each said bone conduction transducer assembly being structurally and electrically interconnected to said transceiver by a respective said structural arm.

30. The underwater audio communication system of claim 29, wherein at least one said structural arm is resilient to define a means for accommodating different head sizes of divers.

31. The underwater audio communication system of claim 29, wherein at least one said structural arm has an adjustable length.

* * * * *